(12) United States Patent
Miwa et al.

(10) Patent No.: US 6,351,439 B1
(45) Date of Patent: Feb. 26, 2002

(54) METHOD AND SYSTEM FOR MANAGING ACCESS TO DATA THROUGH DATA TRANSFORMATION

(75) Inventors: Kunihiko Miwa, Hiratsuka; Hiroya Kobayashi, Machida; Norishige Morimoto, Tokyo-to, all of (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/269,917
(22) PCT Filed: Aug. 12, 1997
(86) PCT No.: PCT/JP97/02822
  § 371 Date: Apr. 1, 1999
  § 102(e) Date: Apr. 1, 1999
(87) PCT Pub. No.: WO98/16928
  PCT Pub. Date: Apr. 23, 1998

(30) Foreign Application Priority Data

Oct. 16, 1996 (JP) .............................. 8-273551

(51) Int. Cl.⁷ ................................................ G11B 7/00
(52) U.S. Cl. .................................................. 369/47.18
(58) Field of Search ........................... 369/53.2, 53.22, 369/53.27, 47.12, 47.13, 84, 47.18, 47.19

(56) References Cited

U.S. PATENT DOCUMENTS

| | | | | |
|---|---|---|---|---|
| 5,870,583 A | * | 2/1999 | Maeda ........................ | 369/32 |
| 5,901,119 A | * | 5/1999 | Inoue ........................... | 369/32 |
| 5,920,535 A | * | 7/1999 | Hisamatsu et al. ........... | 369/32 |
| 5,920,541 A | * | 7/1999 | Sasaki et al. ................. | 369/32 |
| 6,088,304 A | * | 7/2000 | Aramaki et al. .............. | 369/32 |
| 6,088,312 A | * | 7/2000 | Utsumi ......................... | 369/32 |

FOREIGN PATENT DOCUMENTS

| | | |
|---|---|---|
| JP | 5-258463 A | 8/1993 |
| JP | 06-302092 A | 10/1994 |
| JP | 07-274115 A | 10/1995 |

* cited by examiner

*Primary Examiner*—Nabil Hindi
(74) *Attorney, Agent, or Firm*—Scully, Scott, Murphy & Presser; Casey P. August (57) ABSTRACT

In providing a system that can manage access to data to effectively prevent illegal access to the data or the like, there is provided a system for embedding access management information that prepares management information for managing access to the data, and embeds the management information in the data through data transformation without changing amount of data. In managing access to data, there is provided a method that extracts management information embedded in the data through data deformation without changing amount of data, and manages access to the data according to the extracted management information. There is also provided a method for changing management of access to the data according to the type of medium in which the data is stored (RAM or ROM). The management information further contains information for controlling recording of the data, reception of the data, playback of the data, interference of output of the data, duplication history of the data, or modification of the management information. The access management method can prevent illegal duplication of data or the like, and can effectively protect a work.

11 Claims, 7 Drawing Sheets

BINARY-CODED INFORMATION a = (011010)

DEFINITION OF A PIXEL BLOCK

SELECTED PIXEL BLOCK

PROCESS FOR REPLACING PIXEL BLOCKS

| DATA (a) | ORIGINAL | | | ENCODED | |
|---|---|---|---|---|---|
| $a_1 = (0)$ | 122 | 135 | → | 122 | 135 |
| $a_2 = (1)$ | 101 | 125 | → SWAP | 125 | 101 |
| $a_3 = (1)$ | 91 | 88 | → | 91 | 88 |
| $a_4 = (0)$ | 35 | 58 | → | 35 | 58 |
| $a_5 = (1)$ | 147 | 160 | → SWAP | 180 | 147 |
| $a_6 = (0)$ | 45 | 23 | → SWAP | 23 | 45 |

METHOD AND SYSTEM FOR MANAGING ACCESS TO DATA THROUGH DATA TRANSFORMATION

FIELD OF THE INVENTION

The present invention relates to a method and system for managing access to data by utilizing management information embedded in the data. More particularly, it relates to embedding management information into data through data transformation without changing the amount of data and managing access to the data, based on this management information, when the data is accessed.

BACKGROUND ART

With the spread of multimedia environments, systems handling digital information, such as digital video disks (DVDS), digital video cameras (DVCs), digital CS satellite broadcasting, and internets, are becoming still more popular. Also, the development of apparatuses that can process and transfer very large quantities of multimedia data at high speed has advanced. However, it depends upon the number of applications for attraction contents such as theater movies whether or not the aforementioned apparatuses will be spread from now on. No matter how excellent hardware may be, the spread of the hardware would be difficult unless a large quantity of contents that attracts the purchasing desire of customers are distributed.

What becomes problematic at this time is the protection of works. For example, digital video disks have a sufficient hardware based method in the distribution of theater movies, however, for problems with protection of contents, particularly with illegal duplication (copy), there have been no methods provided such as suppliers of contents can satisfy. This is because, although the contents of digital data can be easily duplicated and changed, there is provided no effective specification to prevent such action. Thus, it is the current status that many attractive contents cannot be expected to be distributed with these media. In fact, since such problems with copyright have not been solved, digital video cameras have only been sold as exclusive machines for photographing. Thus, effectively protecting digitized works is indispensable for a further spread of multimedia, and the development of such protection techniques and the generation of normalized standards have been expected.

One of conventional attempts to control duplication of digital contents such as music is to adopt a copy generation management system (CGMS) signal in digital audio tape (DAT). The CGMS signal is constituted by two bits of data and represents the following duplication conditions.

| CGMS Signal | Duplication Conditions |
| --- | --- |
| 11 | Duplication inhibition |
| 0 | No limitations on duplication |
| 10 | One-time duplicability |

The aforementioned method writes the two data bits in a predetermined place of data format. When duplication of data is performed, the aforementioned CGMS signal is detected at the side of a receiver. If the content of the signal represents duplication inhibition, the receiver stops the duplication of the content. However, this written place can be easily specified and the content can also be easily written over, so it is easy for users to overwrite the content of this signal. That is, it is difficult in the conventional technique to effectively prevent the illegal duplication of contents because it has various disadvantages such that it is an approach to append data management information separate from the data: and it is easy to identify where is the management information.

Hence, there has been a desire for the development of techniques that can effectively control access to digital contents and effectively prevent illegal duplication.

DISCLOSURE OF THE INVENTION

In view of the aforementioned problems, the objective of the present invention is to provide a system that is capable of controlling access to data and effectively preventing illegal access to data or the like.

To attain such objective, there is provided an access management information embedding system for preparing management information for managing access to data, and embedding the management information in the data through data transformation not changing amount of data, wherein the management information embedded through data transformation not changing amount of data is extracted in managing access to the data, access to the data being managed according to the extracted management information. In addition, management of access to the data is varied according to the type of medium in which the data is stored such as RAM (rewritable type), R (write once type) or ROM (read-only type). In addition, the management information is arranged to contain information for controlling recording of the data, reception of the data, playback of the data, interference of output of the data, duplication history of the data, or modification of the management information.

Controlling recording of the data means that, when the management information is embedded in data contained in a medium such as a CD-ROM, the content of the CD-ROM is permitted or inhibited to be duplicated in another medium such as a digital video disk.

Controlling reception of the data means that, when the management information is embedded in data incoming over, for example, radio wave or a network, the data is received by a receiver, and permitted or inhibited to be output from the receiver.

Controlling playback of the data means that, when the management information is embedded in data contained in a medium of a type such as a RAM (rewritable type) or R (write-once type), the data is permitted or inhibited to be reproduced.

Controlling interference of output of the data means that, when the management information is embedded in data contained in a medium of a type such as a RAM or R, the data is permitted or inhibited to be output outside, or output interference is controlled by superimposing noise on an output signal.

Controlling duplication history of the data means that, for example, when the management information embedded in the data contains information allowing duplication only once, after duplication is performed once, additional information for inhibiting duplication other than the management information is added to the management information, whereby further duplication or playback is controlled by the management information and the additional information.

Controlling modification of the management information means that, for example, when the management information embedded in the data contains information allowing duplication only once, after duplication is performed once, the management information itself is modified to inhibit further duplication.

Although the management information relates to recording, duplication, reception, playback, duplication history, output interference or the like of the data, the present invention controlling access based on the content of embedded management information in accessing the data can be appropriately applied to other management such as restriction on access equipment, restriction of access users, deadline for use of data, and authentication information without departing from the spirit of the invention.

"Embedding" used herein means to hide specific information through deformation of data itself by using data hiding technique or the like. Here, data hiding is a generic term of technique for embedding information in another medium (still image, audio, motion image, or the like). Unlike encryption, the technique does not aim how to hide information, but how to integrate information in a medium in which it is embedded.

One of the important features of data hiding lies in that it is an invisible marking technique. Since it is not to add a data bit when information is embedded in a medium, but the information is embedded by manipulating existing data so that it cannot be perceived by human visual sensation (data transformation), there is no increase in the total amount of data due to embedding of additional information. For example, the storage side can handle one type of medium through embedding of text or audio information in an image. One of the other features includes indivisibility of the embedded information. Since the data hiding directly embeds additional information in the data structure of the medium, not in a header or a separate file, the embedded information can be extracted as long as the quality of the original data is saved even if the platform of the medium or the data format is changed.

The present invention is an invention relating to a method and system for managing access to data by utilizing management information embedded in the data with use of such data hiding technique or the like. It should be noted that the access management method according to the present invention is not limited to a specific data hiding technique, but any technique can be utilized as is as long as it embeds information through data transformation without changing amount of data.

Reference numerals and designations for major components correspond as follows:

| | | | |
|---|---|---|---|
| 51 | DVD-ROM | 52 | Reader |
| 53 | Decoder | 54 | Decryption unit |
| 55 | MPEG decoder | 56 | Management information extractor |
| 57 | D/A converter | 58 | Management information modifier |
| 59 | Switch | 60 | Interference signal generator |
| 61 | Data supplier | 62 | Signal processing system |
| 63 | Output section | | |

BEST MODE FOR CARRYING OUT THE INVENTION

Figure 1:
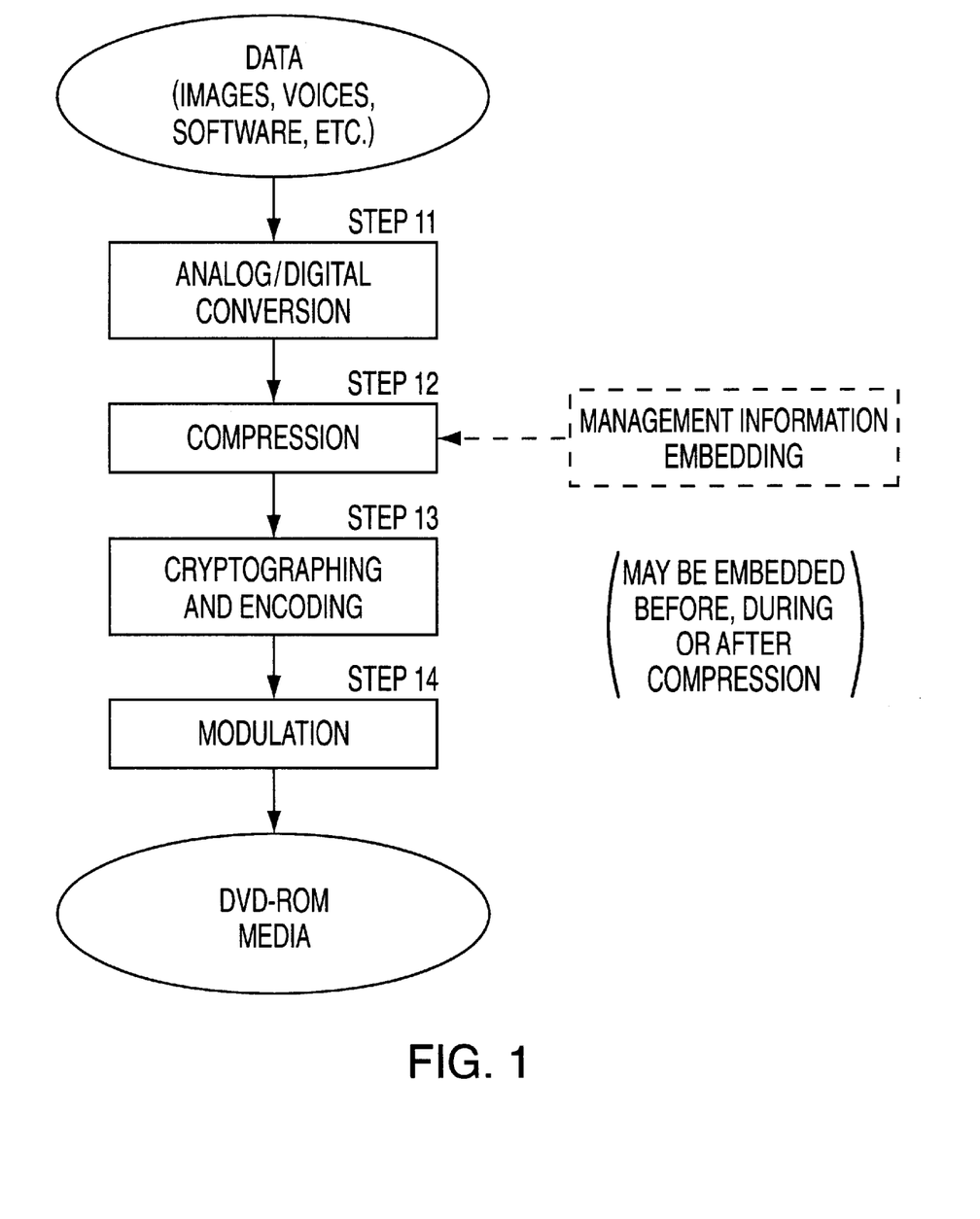
FIG. 1 is a diagram showing a procedure for recording media data on a storage medium.

FIG. 1 is a diagram showing a procedure (authoring) for recording data on a storage medium. Data, such as images, voices, and software, is recorded on DVD-ROM media in accordance with the following procedure. Data that is analog data is converted to digital data by performing analog/digital conversion processing (step 11). This converted digital data is compressed, for example, with a moving picture experts group (MPEG) (step 12). This compressed data is further coded and encrypted (step 13). Finally the media data is modulated (step 14) to be recorded on DVD-ROM media.

In this embodiment of the present invention, data is embedded with management information before, during or after compression, and then is recorded on a DVD-ROM device. When systems have access to the data recorded on DVD-ROM, the management information is used to restrict the access to the data, and based on this management information, systems are controlled. In this embodiment, management information for managing duplication of data will be described as an example. The management information represents respective status with two-bit data, as particularly illustrated in Table 1 below.

TABLE 1

| Status | Contents of management information |
|---|---|
| Duplication inhibition | 11 |
| No limitations on duplication | 00 (or no data) |
| One-time duplicabiiity | 10 |

The embedding of management information into data is performed, for example, between analog/digital conversion (step 11) and MPEG compression (step 12) (or, after compression). This embedding can be done by a technique called data hiding.

Here, a description will be made of, as an example, pixel block coding (hereinafter referred to as PBC) which is both a method of embedding management information which becomes an object of hiding into certain data and conversely a method of extracting the embedded data.

When PBC is employed, in data hiding and data extraction, data are processed according to a predetermined conversion rule. Generally, in a certain image, the primary characteristics, such as pixel values of two adjacent pixels, have mutually high correlation. For example, if there exists a "forest" area in a part of image, adjacent pixels are in very similar green, and have mutually high correlation. Therefore, even if these pixel values were replaced with each other, such replacement could be little visually perceived. That is, even if pixel values with high correlation are manipulated according to a certain conversion rule, a degradation would not virtually arise.

In view of this nature, one bit of data is hidden by defining as a pixel block (i.e., a region to be embedded) an image region having at least one pixel and also by intentionally controlling the characteristic of an adjacent pixel block, based on a certain conversion rule. Data is expressed by the comparison result of the characteristics of adjacent pixel blocks. Also, when data is extracted, it is extracted according to the extraction rule which is determined based on this conversion rule.

Bit information is expressed by replacing the characteristic values (e.g., brightness values) of two adjacent pixel blocks with each other in accordance with the following conversion rule.

(Conversion Rule)

Bit 1: Case where the characteristic value of one pixel block (PB1) is greater than that of the other (PB2)

Bit 0: Case where the characteristic value of one pixel block (PB1) is less than that of the other (PB2)

Also, the bit information is extracted by comparing the characteristic values (e.g., brightness values) of two adjacent pixel blocks in accordance with the following extraction rule corresponding to the aforementioned conversion rule.

(Extraction Rule)

Case where the characteristic value of one pixel block (PB1) is greater than that of the other (PB2): bit 1

Case where the characteristic value of one pixel block (PB1) is greater than that of the other (PB2) : bit 0

Figure 2:
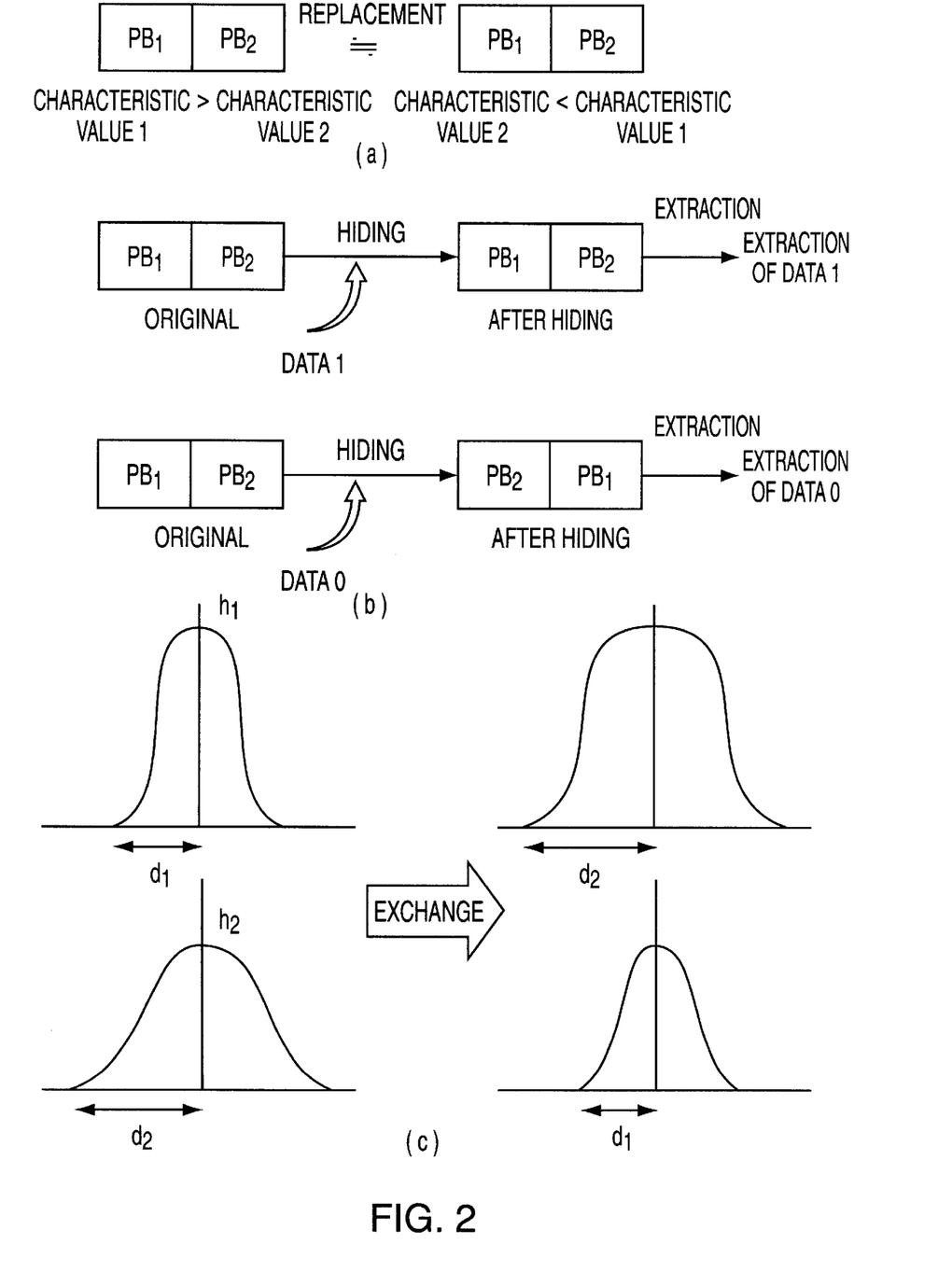
FIG. 2 is a diagram for explaining the hiding and extraction of data employing PBC (Pixel Block Coding)

FIG. 2 is a diagram for explaining how the hiding and the extraction of data are performed with the aforementioned PBC. The pixel block PB1 or PB2 may be defined, for example, as a set of a plurality of pixels such as 3×3 pixels, and it is also possible to define a single pixel as a single pixel block. Since adjacent pixel blocks have high correlation, image degradation would not be felt to the extent that it could be visually recognized, even if the positions of adjacent pixel blocks were replaced with each other (FIG. 2(*a*)). Consider the case where the positions of the pixel blocks in an original image are those shown in FIG. 2(*b*). First, the characteristic values of two pixel blocks are compared, and as the result, assume that the characteristic value of PB1 is greater than that of PB2. When data 1 is hidden in the original image, the characteristic values of the pixel blocks have already satisfied the condition of the data 1 in the conversion rule, so the characteristic values or these blocks are not replaced with each other. On the other hand, when data is extracted, the extraction rule has defined that the case of the characteristic value of PB1 being greater than that of PB2 is data 1, so data 1 is extracted.

In addition, when data 0 is hidden in the original image, the relation between the characteristic values of the pixel blocks in the original image does not satisfy the condition of data 0 in the conversion rule, so the characteristic values of the pixel blocks are replaced with each other. However, this replacement cannot be recognized visually. When data is extracted, data 0 is extracted from the relation of the characteristic values of these blocks in accordance with the extraction rule.

The characteristic value can employ a value related to the primary characteristic and a value related to the secondary characteristic of a pixel block (i.e., a region to be embedded), besides the aforementioned brightness value. The primary characteristic is the direct parameter of a pixel value, such as the brightness or chromaticity of a pixel block. Also, the secondary characteristic is obtained by resolving the primary characteristic, like a value representative of statistical nature such as the average value or dispersion value of the aforementioned parameters.

In addition, it is noted that pixel blocks that become objects of PBC are not always limited to adjacent blocks.

The characteristic value of a pixel block will hereinafter be described with the brightness value that is the primary characteristic and the dispersion value that is the secondary characteristic, as examples.

Figure 3:
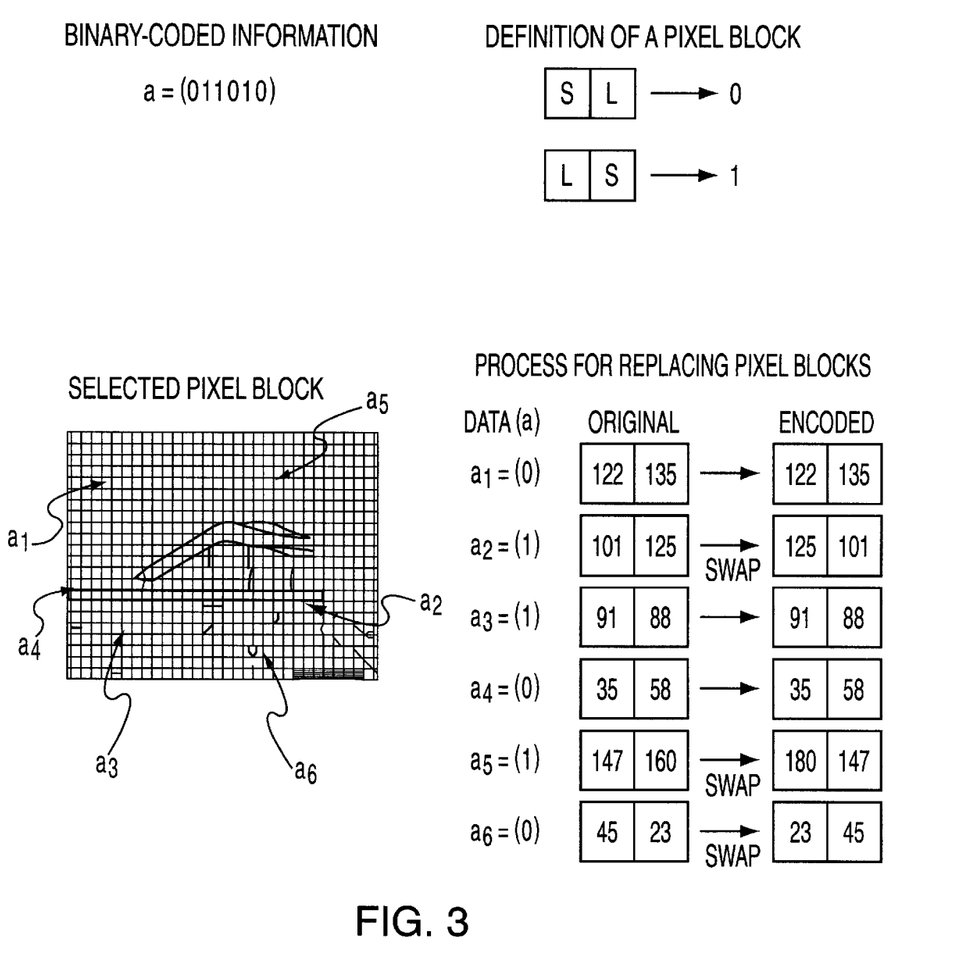
FIG. 3 is a diagram for explaining the data hiding using PBC in the case where one pixel comprises a pixel block.

First, a description will be made of the case where the characteristic value of a pixel block is taken to be a brightness value. Since most natural images have a very high correlation between adjacent pixels, replacing them with each other will not result in a considerable degradation in the image. FIG. 3 is a diagram for explaining the embedding of data of six bits in six pixel blocks based on the aforementioned PCB in the case where 1 pixel corresponds to a pixel block.

In case where blocks containing relatively large number of pixels are used to improve resistance against editing or compression of images, if the brightness values of pixels are replaced with each other between pixel blocks, noise such as stripes may occur on the image. Hence, there is considered a method that employs a dispersion value of the brightness of pixels as a characteristic value.

When the nature of the brightness value of a pixel block is resolved into an average value h and a dispersion value d, there could be a less influence on the image in case where, in the pixel blocks, the average value h remains the same and only the dispersion value d is replaced than in case where the average value is simply replaced. Therefore, it becomes possible to hide information through the data transformation without changing amount of data by making use of this nature, taking the characteristic value of a pixel block to be this dispersion value d, and replacing this dispersion value in accordance with the aforementioned conversion rule. See Japanese Patent Application No. 8-159330.

As in FIG. 2(*c*), consider the case where a pixel block PB1 has an average value $h_1$ and a dispersion value $d_1$ and a pixel block PB2 has an average value $h_2$ and a dispersion value $d_2$. When a bit 1 is hidden, $d_1$ is less than $d_2$, so this does not satisfy the condition of bit 1 of the conversion rule. Therefore, only the dispersion values $d_1$ and $d_2$ are replaced with each other between both pixel blocks. This is equivalent to exchanging the sizes of configurations of distributions without changing the average values h of characteristic values of pixels in the blocks.

Thus, the embedding of data using the aforementioned data hiding technique, first specifies an embedding region, into which management information is embedded, in the aforementioned data. Then, a conversion rule where the contents of data to be embedded is caused to correspond to the status (characteristic) of an embedding region is made, and the status (characteristic) of the embedding region is directly controlled according to management information by referring to the conversion rule. By this direct control, the management information can be embedded into the data. By directly controlling original data, the embedding of the management information united to the original data is performed. Therefore, since the separation and change of only the management information are difficult, the access management of data can be effectively performed. Note that for the details of PBC, see Japanese Patent Application No. 8-159330. In addition, such techniques are comprehensively called data hiding, electronic watermark.

The data embedded with management information with the data hiding technique and stored on a DVD-ROM device by the aforementioned method is accessed according to the following procedure. First, data is read out from the DVD-ROM device. The read-out data is, as described in connection with FIG. 1, a signal modulated (in step 14) after data embedded with management information is compressed (in step 11) with MPEG and also after media data is coded and encrypted (in step 12).

Figure 4:
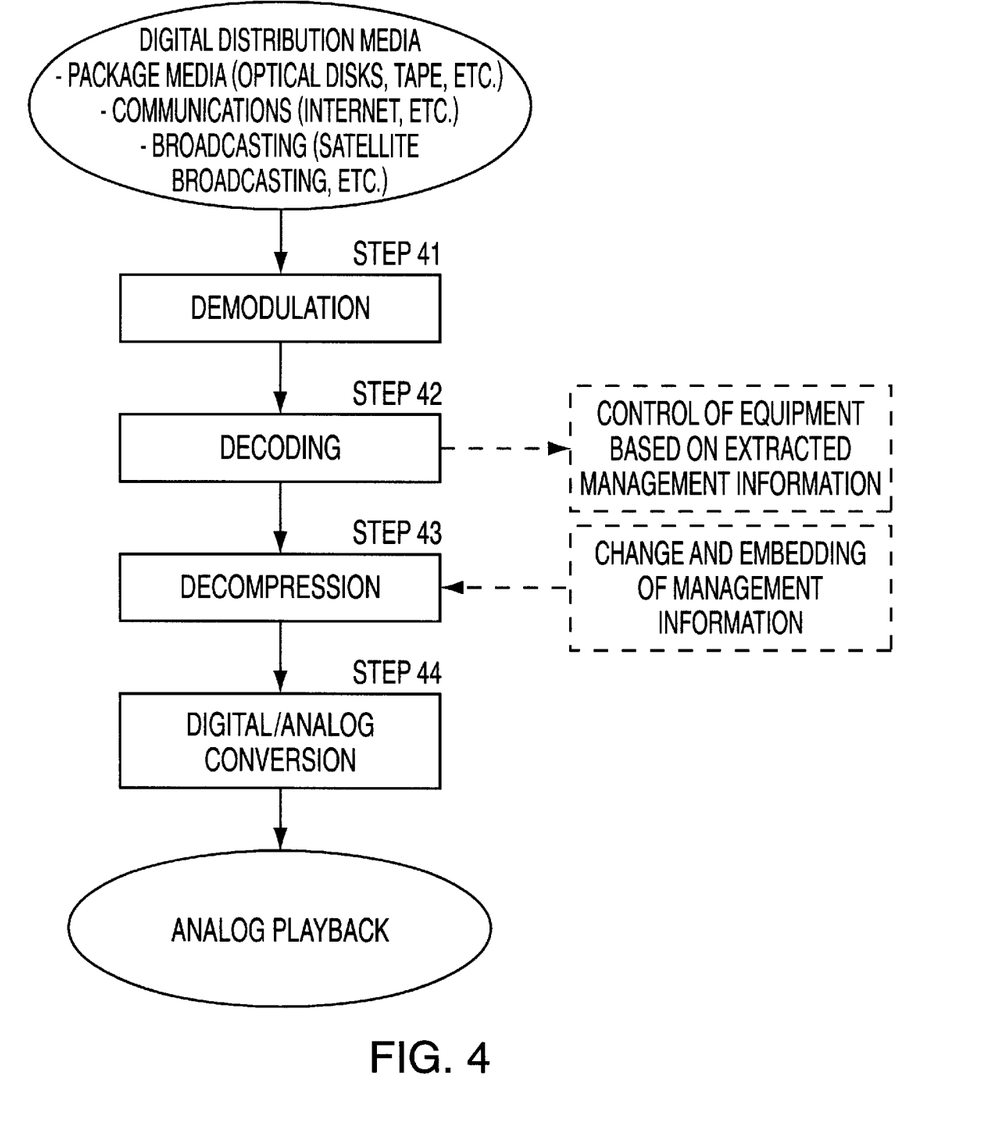
FIG. 4 is a diagram showing procedure for managing playback of data recorded on a medium.

FIG. 4 is a diagram showing a procedure for managing the data access method. First, data embedded with management information is supplied to the access system. The source of data includes, for example, storage media such as DVD-ROM and CD-R, communication such as internet, or satellite broadcasting. The supplied data is demodulated (in step 41) and decoded (in step 42). If the data is MPEG compressed, it is decompressed (step 43). The management information embedded in the data is extracted, and, if required, the content of management information is modified, and only required modification is embedded in the data again.

To extract management information from data input into the recorder, the aforementioned extraction process that is one of the data hiding methods is utilized. First, an embedding region, in which the management information was embedded, is specified from read-out data. Next, by referring to the extraction rule where the status of an embedding region is caused to correspond to the contents of data, the duplication enabling information is extracted according to the status of the embedding region. Now, if the extracted management information is data 00, duplication of data is allowed according to the aforementioned rule. Also, if the extracted management information is data 11, it means that duplication of media data is inhibited. In this case an access system is controlled so that duplication of data is inhibited. Data 10 means that duplication of media data is allowable under a certain condition (only once). This means that duplication is allowed to be generated based on data in an original DVD-ROM, but further duplication based on the duplicated data is inhibited.

In this case an access system is controlled so that duplication of data is allowed only once, and furthermore, it is necessary that data is prevented from being duplicated based on the duplicated data. Since it is important that the duplication thereafter, based on the duplicated data from the original, is inhibited, when the original is duplicated, duplication condition indicated by the management information embedded in the original data is rewritten from data 10 (one-time duplicability) to data 11 (duplication inhibited) and then it is output as an output signal. Since the data as this output signal is embedded with management information indicating the condition of "duplication inhibited," data cannot be further duplicated based on the duplicated data. In addition, there is an option adding bits that indicates history of duplication once. It is essential in the subsequent playback control to determine whether it is legally copied of illegally copied.

Figure 5:
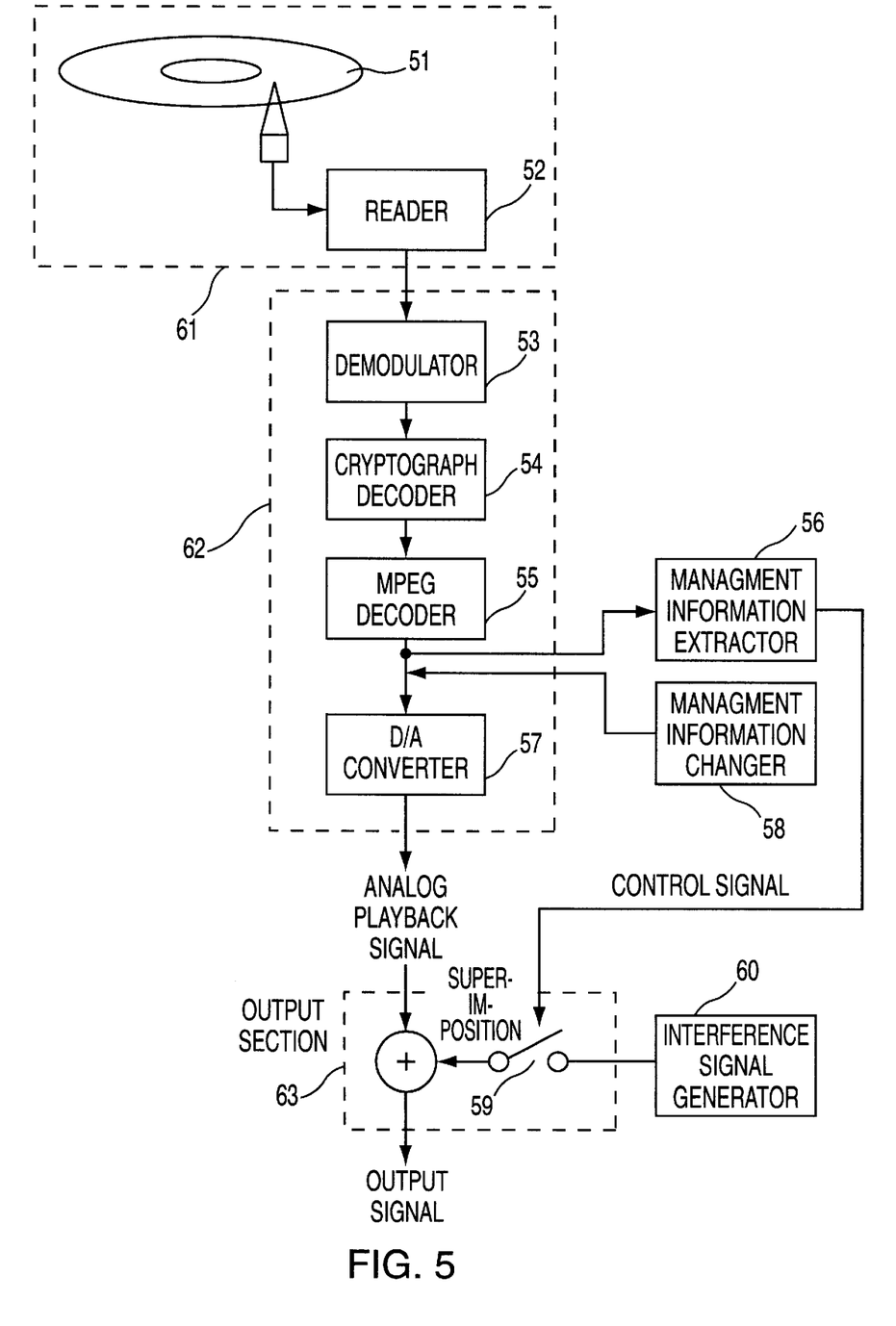
FIG. 5 is a block diagram of a system for managing access to data and outputting the data.

FIG. 5 is a block diagram of a playback system for data stored on a DVD-ROM device. The DVD-ROM device 51 on a data supply supplier 61 stores data in which management information was embedded with the data hiding technique, as described above. The data, read out of the DVD-ROM device 51 by a reader 52 in the data supplier 61, is processed by a demodulator 53, a cryptograph decoder 54, and an MPEG decoder 55, all of which constitute a signal processing system 62. As a consequence, decompressed digital data is obtained.

A management information extractor 56 specifies embedding region, in which management information was embedded, from the decompressed digital data which is the output of the MPEG decoder 55 (or, directly from MPEG data), and also extracts the management information in accordance with the status of the embedding region by referring to an extraction rule where the status of an embedding region is caused to correspond to the contents of data to be extracted. A D/A converter 57 converts digitized data from which the management information was removed to an analog signal. Furthermore, a management information changer 58 is used to change the content of management information as needed. (Here, it should be noted that the management information may be extracted regardless of before or after the MPEG decompression.)

A D/A converter 57 in the signal processing system 62 converts digitized data from which the management information was removed to an analog signal, and outputs an analog playback signal (e.g., NTSC). In addition, an interference signal generated by an interference signal generator 60 (e.g., Analogous Protection System (APS) such as Macrovision Signal) is selectively superimposed on the analog playback signal by a switch 59 in an output section 63. The switch 59 is controlled by a control signal from the management information extractor 56. The output section 63 outputs the analog playback signal or the superimposed signal as analog an output signal.

In this system, the management information extractor 56 outputs a control signal to turn off the switch 59, when the management information extracted by the management information extractor 56 enables duplication of data. In this case, the interference signal is not superimposed on the analog playback signal, and an analog output signal is output as it is.

When, on the other hand, management information inhibits duplication of data, the management information extractor 56 outputs a control signal to turn on the switch 59. In this case an interference signal generated by the interference signal generator 60 is superimposed on the analog signal, which was output from the D/A converter 57. When it is intended to display movie images on a monitor based on the signal on which the interference signal is superimposed, normal movie images can be displayed on the monitor without being affected by the interference signal because of the characteristics of the monitor. However, if it is intended to record the movie images by using a digital VTR with an analog input terminal, they are affected by the interference signal, and normal movie images cannot be recorded. Therefore, duplication of data can be effectively prevented because the movie images can be reproduced from the signal superimposed with the interference signal, but they cannot be digitized for recording.

Note that when management information is "one-time duplicability" on the recorder, the management information changer 58 changes the management information of read-out data to "duplication inhibited" when it is recorded, and embeds it in the data when it is written to a next medium. Thus, the data duplication thereafter, based on duplicated data, can be effectively prevented.

Furthermore, in addition to the basic management information, additional information, as particularly illustrated in Table 2 below, may be used to control copy (duplication) and playback in more detail. This enables it to flexibly provide control depending on the type of recording/playback medium (such as ROM, RAM or R type).

TABLE 2

| Status | | | Management information | Additional information |
|---|---|---|---|---|
| Playback medium ROM type | Playback medium RAM type | Recording medium ROM type | | |
| Playback: OK | Playback: NG | Duplication: NG | 11 | 0 |
| Playback: OK | Playback: NG | Duplication: NG | 11 | 1 |
| Playback: OK | Playback: OK | Duplication: OK | 0 | 0 |
| Playback: OK | Playback: OK | Duplication: OK | 0 | 1 |
| N/A | Playback: OK | Duplication: NG | 10 | 0 |
| N/A | Playback: OK | Duplication: NG | 10 | 1 |

Zero 0 in the additional information indicates that no duplication is performed, while 1 indicates that duplication is performed once. In addition, N/A for the ROM type playback medium means that this combination does not exist. That is, duplication/playback control can be flexibly performed in more detail without erasing/modifying the basic management information by using one-bit information indicating whether or not duplication is performed once in addition to information of data 11 unconditionally duplication inhibited), 10 (one-time duplicability), and 00 (unconditionally duplication allowed). The additional information may be embedded by the same method for the previously embedded data (management information), or by another method to enhance security. As an alternative embodiment, the additional information may be arranged to provide versatile controls by using a number of bits, instead of one bit. Anyway, it may be similarly implemented without departing the spirit of the present invention.

In addition, the management information is not limited to information on restriction on duplication. It is a matter of course that the present invention is also applicable to various management information, such as information for controlling a system. For example, management information may also be the following playback enabling information, as particularly illustrated in Table 3 below.

TABLE 3

Medium type = RAM

| Status | Contents of management information |
|---|---|
| Playback inhibition | 11 |
| No limitation on playback | 00 (or no data) |
| One-time regenerability | 10 |

When playback enabling information enables playback of data, a system is controlled so that playback of data is allowed. Also, when playback enabling information inhibits playback of data, a system is controlled so that data is not output from the system. Besides the aforementioned information, the management information may be a serviceable term which determines a period of time for which media data can be regenerated or recorded, authentication information for medium content playback, a disk key, or a title key. Any of these pieces of information is data that becomes necessary when data is accessed.

Another data hiding technique is described as a second embodiment. It is noted that this embodiment is different from the aforementioned embodiment in that the embedding of management is performed at the time of MPEG encoding and that the extraction is performed at the time of MPEG decoding.

Now, how embedding of management information is actually performed in MPEG is briefly explained by refer- ring to the data hiding technique of Japanese Patent Application No. 8-272721 as an example.

In MPEG, forward prediction from a past playback image, rearward prediction from a future playback image, and bidirectional prediction using both forward prediction and rearward prediction are employed.

Figure 6:
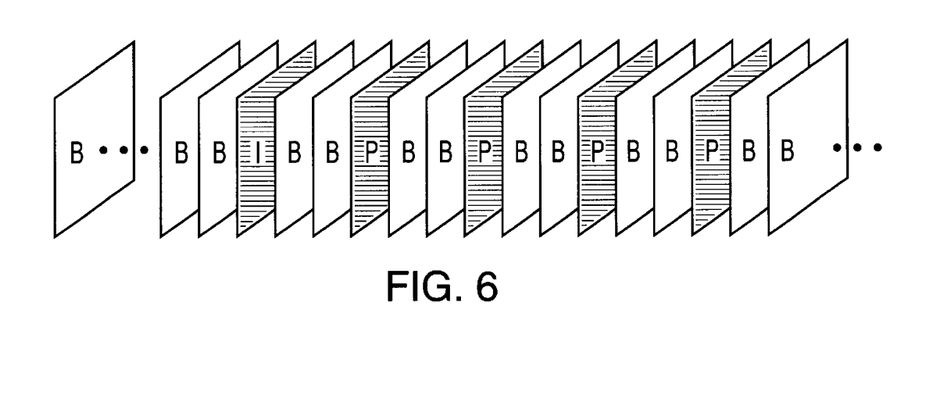
FIG. 6 is a diagram illustrating an arrangement of pictures in MPEG.

FIG. 6 is a diagram for explaining the array state of pictures in MPEG. As shown in the figure, in order to realize bidirectional prediction, MPEG prescribes three kinds of picture frames: an I picture, a P picture, and a B picture.

Here, the I picture is an image processed with intra frame encoding (intra-encoding), and all macro blocks on this picture are processed by intra-encoding (intra frame prediction encoding). The P picture is an image processed by forward interframe prediction encoding, and in some cases, some of macro blocks on this picture are processed with intra-encoding. Furthermore, the B picture is an image processed by bidirectional interframe prediction encoding. The macro blocks on the B picture are basically coded by forward prediction, rearward prediction, or bidirectional prediction, but in some cases, intra-encoding is also included. The picture screen which is coded over the entire surface by intra-encoding is an I picture, and the I and P pictures are coded in the same order as an original moving picture image. On the other hand, for the B picture, the I and P pictures are processed and then a B picture which is inserted between the processed pictures is coded.

Figure 7:
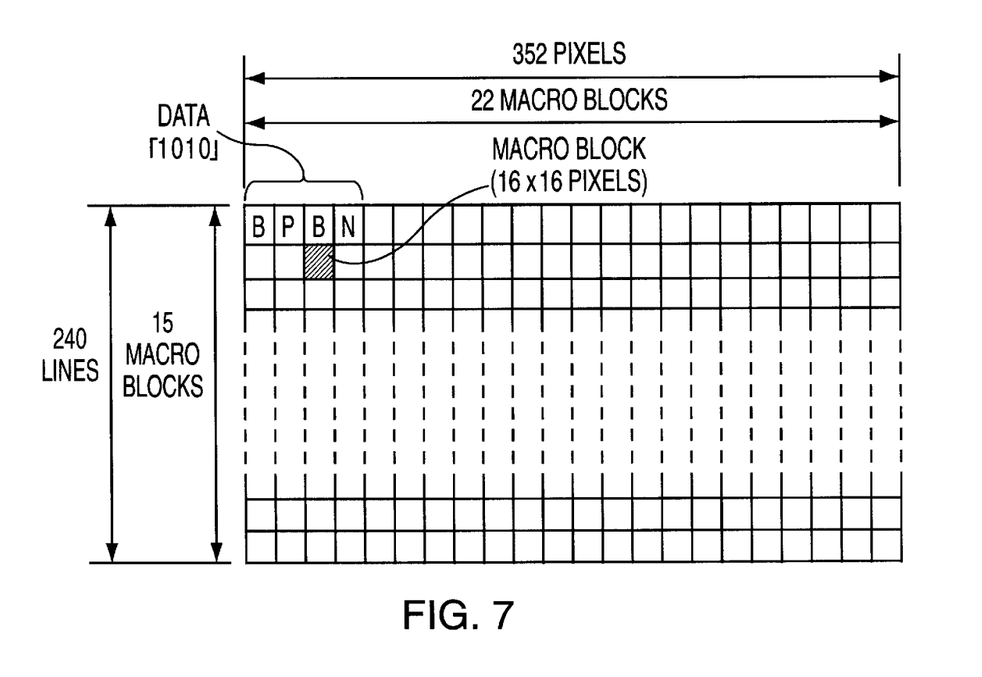
FIG. 7 is a diagram showing the state of macro blocks arranged in a B picture.

The embedding region in which management information is embedded is the macro block on the B picture, and one bit of information can be embedded into one macro block. Therefore, when message data are multiple bits, there is the need to perform the embedding process with respect to the macro blocks corresponding in number to the multiple bits. FIG. 7 is a diagram showing the state of macro blocks disposed on a B picture. The macro block is the unit that is coded. For each macro block, movement compensation relative to a brightness block with 16 pixels×16 pixels is performed, and information compression based on a time screen correlation is performed as an interframe prediction method using movement compensation relative to a macro block unit.

The macro blocks on the B picture can be classified into the following four groups as prediction types.

Intra Macro Block (Intra frame Prediction Macro Block)
The intra macro block is a macro block that is coded by only the information about the screen itself without performing interframe prediction.

Forward Prediction Macro Block
The forward prediction macro block is a macro block that is coded with forward prediction by referring to the past I or P picture (reference frame). Specifically, a square region with 16 pixels×16 pixels, which is most similar among the past reference frames, is retrieved, and this macro block has information about a prediction error (AP) which is the difference relative to the retrieved square frame and also has information about a spatial relative position (a moving vector). Here, the prediction error $\Delta P$ is expressed as a difference between the brightness and the color difference obtained for 16 pixels×16 pixels. Note that a criterion for selecting a similar square region depends upon encoders.

Rearward Prediction Macro Block
The rearward prediction macro block is a macro block that is coded with rearward prediction by referring to future reference frames in order of display. A region, which is most similar among future reference frames, is retrieved, and this macro block has information about a prediction error ($\Delta N$) which is the difference relative to the retrieved region and also has information about a spatial relative position (a moving vector).

Bidirectional Prediction Macro Block

The bidirectional prediction macro block is a macro block that is coded with bidirectional prediction by referring to past and future reference frames. A region which is most similar among past reference frames and a region which is most similar among future reference frames are retrieved, and this macro block has information about a prediction error $((\Delta N+(P)/2)$ which is the difference relative to the average (per pixel) of these two regions and also has information about a spatial relative position (two moving vectors) between them.

To embed message data, at least one macro block, which is given an embedding process, must first be specified in a B picture. This may be defined, for example, as the respective macro blocks (embedding regions) which exist between the first line and the third line of the B picture, or it may be defined as the entire macro block of a certain frame. In addition to the macro block being previously defined as format in this way, it can also be determined by employing algorithm that generates a position sequence. Note that the algorithm for generating a position sequence can employ the algorithm disclosed, for example, in Japanese Patent Application No. 8-159330. Next, for the specified macro blocks that are embedded, one bit of data is embedded into one macro block, based on an embedding rule. This embedding rule is one where bit information is caused to correspond to the prediction type of a macro block. For example, there is the following rule.

| (Embedding Rule) | |
|---|---|
| Bit information to be embedded | Interframe prediction type of a macro block |
| Bit "1" | Bidirectional prediction macro block (represented by B) |
| Bit "0" | Forward prediction macro block (represented by P) or rearward prediction macro block (represented by N) |

For example, consider the case where management information bits 1010 are embedded. The four bits of data are embedded in four embedding regions disposed from the left first macro block of the first line shown in FIG. 7 up to the fourth macro block. First, the first data bit is a 1, so the prediction type of the leftmost macro block (the first embedding region) is determined to be bidirectional prediction (B) in accordance with the aforementioned embedding rule. The prediction error in this case becomes a prediction error which is the difference relative to the average of a region which is most similar among past reference frames and a region which is most similar among future reference frames. The next data bit is a 0.

Therefore, the prediction type of the second macro block (the second embedding region) is either forward prediction macro block (P) or rearward prediction macro block (N) in accordance with the embedding rule. In this case, in order to suppress image degradation, the prediction error in the forward prediction and the prediction error in the rearward prediction are compared to select the type whose prediction error is smaller. In the example of FIG. 3, since the prediction error in the forward prediction is smaller than that in the rearward prediction, the forward prediction (P) is selected for the second macro block. Similar procedure is repeatedly applied to the third embedding region and the fourth embedding region.

As a consequence, the prediction type of the third macro block becomes bidirectional prediction (B), and the prediction type of the fourth macro block is determined to be rearward prediction (N) because the prediction error in the rearward prediction is smaller. In the way, the interframe prediction types of the first to the fourth embedding regions are taken to be BPBN and four data bits 1010 (i.e., the management information 1010) are embedded in these regions by data transformation without changing amount of data. This is the example of embedding of management information in MPEG using the data hiding technique described in Japanese Published Unexamined Patent Application No. 8-272721.

Now, a description will be made of a method of extracting the management information which was embedded in the aforementioned procedure. In the case where management information is extracted, information for specifying a macro block in which the management information has been embedded must first be given. The specifying information may be given by an outside unit. Also, it is possible to previously embed the specifying information in data itself. In addition, in the case where the position of an embedding region is standardized or if an algorithm for generating a position sequence is known, message data can be extracted. A message data extracting method using a position sequence is disclosed in the aforementioned Japanese Patent Application No. 8-159330, for example.

Next, from the prediction type of the specified embedding region, the information embedded in that region is extracted by referring to an extraction rule. This extraction rule is a rule where the prediction type of a macro block is caused to correspond to bit information, and this extraction rule has to be given as information when extraction is performed. As this rule, there is the following rule. It is noted that the corresponding relation between prediction type and bit information in this extraction rule is the same as that of the aforementioned embedding rule.

| (Extraction Rule) | |
|---|---|
| Interframe prediction type of a macro block | Bit information to be extracted |
| Interframe prediction type of a macro block Interframe prediction type of a macro block | Bit "1" |
| Forward prediction macro block (represented by P) or rearward prediction macro block | Bit "0" |

A description will be made of the case where management information has been embedded as shown in FIG. 7. As previously described, management information bits have been embedded as a premise in the embedding regions from the left first macro block of the first line shown in FIG. 3 up to the fourth macro block. Because the prediction type of the leftmost macro block is bidirectional prediction (B), bit 1 is extracted by referring to the aforementioned extraction rule. The prediction two of the second macro block is forward prediction (P), so bit 0 is extracted according to the extraction rule. By repeatedly applying the same procedure to the other macro blocks, bit 1 and bit 0 are extracted in sequence. As a consequence, management information bits 1010 are extracted from these regions.

According to this embodiment, the prediction type of a macro block and an embedded bit are determined so that they are caused to correspond with each other, when a moving picture image is coded. Therefore, management information can be embedded in the moving picture image without substantially having an influence on the compression efficiency of the moving picture image and also without substantially causing a degradation in the picture quality. In addition, it is very difficult to remove the management information embedded in this way from the moving picture image. Furthermore, since an amount of information to be embedded is almost independent of the contents of an image, it is possible to efficiently embed message data.

As will be seen from the foregoing description, the feature of the present invention resides in that management information is embedded in data by using the data hiding technique or the like, which embeds data through data transformation without changing amount of data, and, when the data is accessed (regenerated or recorded), a system for managing access to the data is controlled based on the management information. Therefore, the present invention is not limited to the aforementioned data hiding method and it is noted that the present invention is applicable to a variety of methods.

Figure 8:
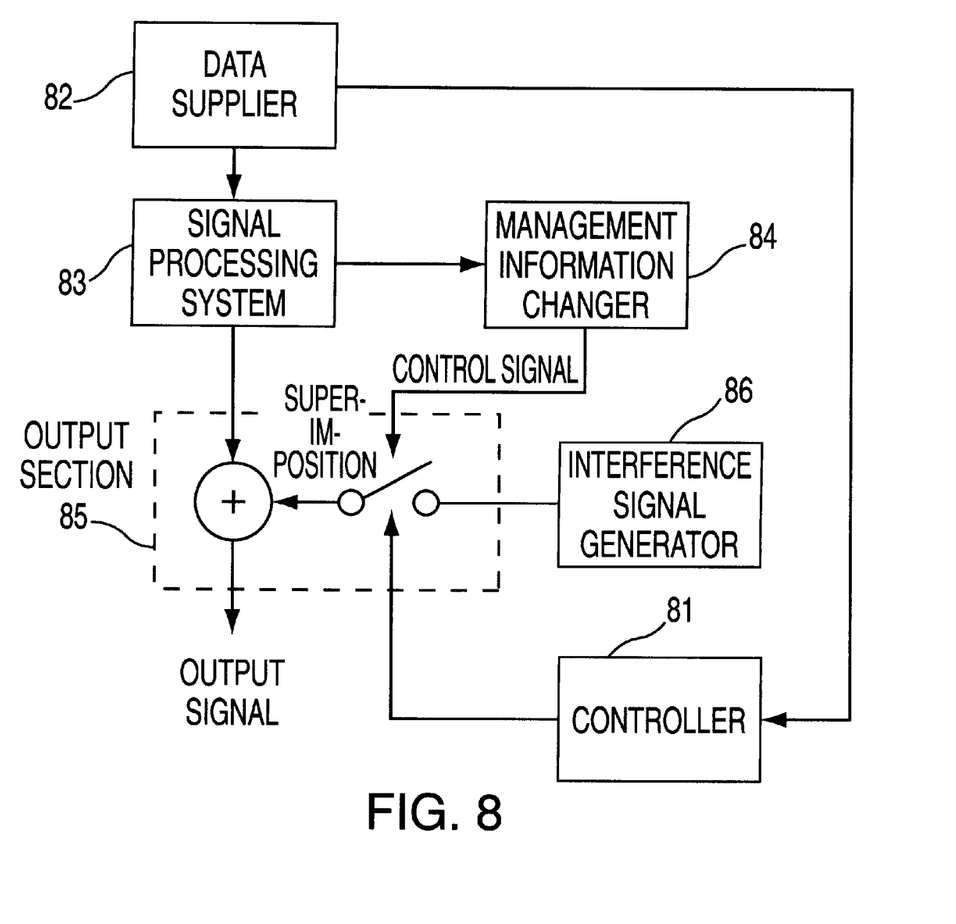
FIG. 8 is a block diagram of a data access management system according to another embodiment.

Finally, a description will be made of a data access system shown in FIG. 8. While the aforementioned management information represents three statuses with two bits, an embodiment described here is intended to substantially provide three statuses for the system with one-bit management information. To this end, the system of the embodiment comprises a controller 81 that detects in what state data is supplied to the system, and controls output of the system according to the state. A data supply unit 82 is to supply data embedded with management information to the access system, and includes, for example, an optical system for reading data from DVD-ROM, and a circuit for capturing data on the internet into the system. Here, the management information is represented by one-bit information respective bit of which indicates the following information.

TABLE 4

| | Management Information |
|---|---|
| Status | Contents of management information |
| Duplication inhibited | 1 |
| Duplication allowed | 0 |

Data supplied from the data supply unit 82 is processed by a signal processing system 83 that performs demodulation, decryption, D/A conversion or the like. A management information extractor 84 specifies an embedding region in which management information is embedded from the data obtained through processing by the signal processing system 83, and extracts the management information according to the state of an embedding region by referring to an extraction rule in correspondence with content of data for extracting the state of the embedding region. The management information extractor 84 outputs a control signal according to the extracted information. The control signal is for controlling an output unit 85, superimposes an interference signal selectively generated by an interference signal generator 86 according to the content of the control signal on the output signal, and outputs them. That is, when the management information is bit 0 (duplication allowed), a switch in the output unit 85 is turned off to output the data. On the other hand, when the management information is bit 1 (duplication inhibited), the switch is turned on to superimpose an interference signal on the data, and to output them. Since the operation is substantially same as that of the components of the system shown in FIG. 5, no further detail is described.

A controller 81 connects to the data supply unit 82, and monitors in what state the data is supplied to the system.

Then, even when the management information is bit 0, or allows duplication of the data, the controller 81 controls the output unit 85 so that the switch in the output unit 85 is turned on depending on the result of supply state to output a superimposed signal. That is, duplication of data is forcedly inhibited, although the management information itself allows duplication of the data.

A specific data supply state is determined by monitoring, for example, "when data is captured into an access system through a recording medium, in duplication, whether the loaded recording medium is a read-only type or a rewritable type." The type of recording medium can be easily determined since it can be recognized in an untamparable area (lead-in area) of the recording medium by the system through hardware. When it is intended to perform duplication of data in a state where the data is being supplied from a read-only recording medium, the controller 81 would not forcedly turn off the switch. Thus, the access system operates after the extracted management information, and data can be duplicated as long as the management information allows the duplication. On the other hand, when it is intended to duplicate data in a state where the data is being supplied from a rewritable recording medium, the controller 81 turns on the switch regardless of the content of management information. Thus, data cannot be duplicated from the rewritable recording medium.

Generally, when famous or important content is prevented from illegal duplication or tampering, a supplier of content stores and distributes it in a ROM. Therefore, the supply state in ROM state means that the data can be considered to be original, rather than duplicated data. On the other hand, when data is supplied as a RAM or R, in most cases, the data can be considered to be duplicated data already duplicated in the RAM or R. Therefore, as long as the data stored in a ROM is considered to be original, and that in a RAM or R is considered to be duplicated data, further duplication of duplicated data, or illegal duplication can be effectively prevented by providing such function in the system. Consequently, even with the one-bit management information that can represent only two status of "duplication allowed or inhibited," the system determines whether or not data is original according to its supply state, so that a third status of "one-time duplicability" can be substantially provided for the system.

Since the management information to be embedded can be represented by one bit, instead of two bits, it becomes unnecessary to take sequence of bit arrangement into account rather than the size of management information. If the content of information differs for the arrangement of bits 01 and 10 when the management information is of two bits, it is necessary to take their sequence into account in extracting the information. However, if it is of one bit, it is not necessary. Therefore, significant improvement is provided for accuracy in extraction of information.

The supply state to be monitored may include a case, "When data is captured through communication or broadcasting, whether or not an access system is connected to a network in duplication" in addition to the aforementioned case. In this case, if data is connected to the network in duplication, the data is considered to be original. However, if data is not connected to a network in duplication, it is considered to be duplicated data further duplicated from duplicated data stored in a location other than the network (e.g., a ROM in the own system). Therefore, for the 10 duplication through a network, it is sufficient to allow duplication under a condition that data is connected to the network. Furthermore, various approaches may be contemplated including monitoring when data is being supplied.

APPLICABILITY IN INDUSTRY

As described above, a supplier embeds an access condition for a receiver of content to be supplied as management information in the content itself, and distributes the content to general public. An access system, which receives the content, contains a function therein that extracts the management information embedded in the content, and controls access to the content according to the access condition defined by the management information. Therefore, the receiving system can effectively inhibit access to the content by the receiver, particularly illegal duplication of the content by the receiver.

What is claimed is:

1. A method for managing access to data by utilizing management information comprising a plurality of bits embedded in the data through data transformation without changing the amount of the data, the method comprising the steps of:

defining a plurality of sets of data regions in the data for the plurality of bits to be embedded in the data, each of the data regions in each set having at least one pixel and the data regions in each set being in mutually high characteristic correlation with each other;

comparing characteristic values between the data regions in each set and embedding a bit of the plurality of bits in each set of data regions by expressing the bit as a function of the characteristic values comparison and a value of the bit;

extracting the plurality of bits of the management information embedded in the data by comparing the characteristic values between the data regions in the defined plurality of sets; and managing access to said data according to said extracted management information.

2. The method as set forth in claim 1, wherein said step for managing the access comprises a step of changing management of access to said data according to the type of medium for storing said data.

3. The method as set forth in claim 2, wherein said type of medium is ROM, RAM or R.

4. The method as set forth in any one of claims 1 through 3, wherein said management information contains information for controlling storage of said data, reception of said data, playback of said data, interference of output of said data, duplication history of said data, or modification of said management information.

5. The method as set forth in claim 4, wherein said step for managing the access comprises a step of, after managing the access to said data according to said management information, embedding, separate from said management information, additional information for managing access to said data in said data, said management information and said additional information managing subsequent access to said data.

6. A system for managing access to data by utilizing management information comprising a plurality of bits embedded in said data through data transformation without changing the amount of data, the system comprising:

a mechanism for defining a plurality of sets of data regions in the data for the plurality of bits to be embedded in the data, each of the data regions in each set having at least one pixel and the data regions in each set being in mutually high characteristic correlation with each other;

a mechanism for comparing characteristic values between the data regions in each set and embedding a bit of the plurality of bits in each set of data regions by expressing the bit as a function of the characteristic values comparison and a value of the bit;

an extractor for extracting the plurality of bits of the management information embedded in the data by comparing the characteristic values between the data regions in the defined plurality of sets; and a unit for managing access to said data according to said extracted management information.

7. The system as set forth in claim 6, wherein said unit for managing access comprises a unit for changing management of access to said data according to the type of medium for storing said data.

8. The system as set forth in claim 7, wherein said type of medium is ROM, RAM or R.

9. The system as set forth in any one of claims 6 through 8, wherein said management information contains information for controlling storage of said data, reception of said data, playback of said data, interference of output of said data, duplication history of said data, or modification of said management information.

10. The system as set forth in claim 9, wherein said unit for managing access comprises:

a unit for, after managing the access to said data according to said management information, embedding, separate from said management information, additional information for managing access to said data in said data; and a unit for managing subsequent access to said data according to said management information and said additional information.

11. A computer program device readable by a machine, tangibly embodying a program of instructions executable by the machine to perform a method for managing access to data by utilizing management information comprising a plurality of bits embedded in the data through data transformation without changing the amount of the data, the method comprising:

defining a plurality of sets of data regions in the data for the plurality of bits to be embedded in the data, each of the data regions in each set having at least one pixel and the data regions in each set being in mutually high characteristic correlation with each other;

comparing characteristic values between the data regions in each set and embedding a bit of the plurality of bits in each set of data regions by expressing the bit as a function of the characteristic values comparison and a value of the bit;

extracting the plurality of bits of the management information embedded in the data by comparing the characteristic values between the data regions in the defined plurality of sets; and managing access to the data according to the extracted management information.

* * * * *

UNITED STATES PATENT AND TRADEMARK OFFICE
CERTIFICATE OF CORRECTION

PATENT NO. : 6,351,439 B1
DATED : February 26, 2002
INVENTOR(S) : K. Miwa

It is certified that error appears in the above-identified patent and that said Letters Patent is hereby corrected as shown below:

Column 1,
Line 54, "Ccnditions" should read -- Conditions --

Column 4,
Line 41, "duplicabiiity" should read -- duplicability --

Column 9,
Line 31, "departing the spirit" should read -- departing from the spirit --

Signed and Sealed this

Second Day of July, 2002

Attest:

Attesting Officer

JAMES E. ROGAN
Director of the United States Patent and Trademark Office